US011763800B2

(12) United States Patent
Panguluri et al.

(10) Patent No.: US 11,763,800 B2
(45) Date of Patent: *Sep. 19, 2023

(54) REAL TIME POPULARITY BASED AUDIBLE CONTENT ACQUISITION

(71) Applicant: Gracenote Digital Ventures, LLC, New York, NY (US)

(72) Inventors: Venkatarama Anilkumar Panguluri, Milpitas, CA (US); Venkata Sunil Kumar Yarram, Cupertino, CA (US); Lalit Kumar, San Jose, CA (US); Gregory P. Defouw, Redwood City, CA (US)

(73) Assignee: Gracenote Digital Ventures, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/969,509

(22) Filed: Oct. 19, 2022

(65) Prior Publication Data
US 2023/0043879 A1    Feb. 9, 2023

Related U.S. Application Data

(63) Continuation of application No. 17/361,111, filed on Jun. 28, 2021, now Pat. No. 11,508,353, which is a
(Continued)

(51) Int. Cl.
*H04N 21/262* (2011.01)
*H04N 21/81* (2011.01)
(Continued)

(52) U.S. Cl.
CPC ............ *G10L 13/08* (2013.01); *G06F 16/639* (2019.01); *G06Q 10/10* (2013.01); *G10L 13/00* (2013.01);
(Continued)

(58) Field of Classification Search
CPC .................... H04N 21/26258; H04N 21/8106
See application file for complete search history.

(56) References Cited

U.S. PATENT DOCUMENTS 5,712,625 A    1/1998  Murphy
6,345,250 B1   2/2002  Martin
(Continued)

FOREIGN PATENT DOCUMENTS

JP    2010130172 A    6/2010
KR    20100000249 A   1/2010
(Continued)

OTHER PUBLICATIONS

GM Voices, Order Voice Files, May 3, 2012, https://web.archive.org/web/20120503032221/https://prompts.gmvoices.com/order.
(Continued)

*Primary Examiner* — Bryan S Blankenagel
(74) *Attorney, Agent, or Firm* — McDonnell Boehnen Hulbert & Berghoff LLP

(57) ABSTRACT

A personalized news service provides personalized news programs for its users by generating personalized combinations of audible versions of news stories derived from text-based versions of the news stories. The audible versions may be generated from the text-based version by a text-to-speech system, or may by recording a person reading aloud the text-based version. To acquire recordings, the personalized news service can make a determination that a particular news story has a threshold extent of popularity. The news service can then transmit a request to a remote recording station for a recording of a verbal reading of the particular news story. The news service can then receive the requested recording from the remote recording station.

18 Claims, 6 Drawing Sheets

Related U.S. Application Data continuation of application No. 16/932,005, filed on Jul. 17, 2020, now Pat. No. 11,081,101, which is a continuation of application No. 16/237,123, filed on Dec. 31, 2018, now Pat. No. 10,762,889, which is a continuation of application No. 15/223,278, filed on Jul. 29, 2016, now Pat. No. 10,290,298, which is a continuation of application No. 14/196,908, filed on Mar. 4, 2014, now Pat. No. 9,431,002.

(51) Int. Cl.
*G10L 13/08* (2013.01)
*G10L 13/00* (2006.01)
*G10L 13/02* (2013.01)
*G06F 16/638* (2019.01)
*H04N 21/2343* (2011.01)
*H04N 21/258* (2011.01)
*G06Q 10/10* (2023.01)
*H04N 21/233* (2011.01)

(52) U.S. Cl.
CPC ............ *G10L 13/02* (2013.01); *H04N 21/233* (2013.01); *H04N 21/234336* (2013.01); *H04N 21/25891* (2013.01); *H04N 21/26258* (2013.01); *H04N 21/8106* (2013.01)

(56) References Cited

U.S. PATENT DOCUMENTS

| | | | |
|---|---|---|---|
| 6,351,679 B1 | 2/2002 | Ainslie |
| 6,438,450 B1 | 8/2002 | DiLorenzo |
| 6,460,036 B1 | 10/2002 | Herz |
| 6,609,253 B1 | 8/2003 | Swix |
| 6,721,781 B1 | 4/2004 | Bates |
| 6,738,972 B1 | 5/2004 | Willard |
| 6,766,523 B2 | 7/2004 | Herley |
| 6,938,209 B2 | 8/2005 | Ogawa |
| 7,006,967 B1 | 2/2006 | Kahn |
| 7,013,478 B1 | 3/2006 | Hendricks |
| 7,200,357 B2 | 4/2007 | Janik |
| 8,036,646 B1 | 10/2011 | Delker |
| 8,281,344 B1 | 10/2012 | Mathias |
| 8,364,757 B2 | 1/2013 | Scott |
| 8,373,768 B2 | 2/2013 | Bill |
| 8,669,457 B2 | 3/2014 | Ringewald |
| 8,886,655 B1 | 11/2014 | Nandy |
| 8,977,374 B1 | 3/2015 | Eck |
| 8,984,147 B1 | 3/2015 | Kret |
| 9,002,703 B1 | 4/2015 | Crosley |
| 9,105,300 B2 | 8/2015 | Resch |
| 9,111,534 B1 | 8/2015 | Sylvester |
| 9,143,718 B2 | 9/2015 | Nagorski |
| 9,213,705 B1 | 12/2015 | Story, Jr. |
| 9,285,947 B1 | 3/2016 | Story, Jr. |
| 9,286,942 B1 | 3/2016 | Hayes |
| 9,355,174 B2 | 5/2016 | Moss |
| 9,380,383 B2 | 6/2016 | Brenner |
| 9,431,002 B2 | 8/2016 | Panguluri |
| 9,432,516 B1 | 8/2016 | Barbulescu |
| 9,454,342 B2 | 9/2016 | Panguluri |
| 9,665,169 B1 | 5/2017 | Dai |
| 9,665,339 B2 * | 5/2017 | Reimann ............... G06F 3/0484 |
| 9,798,509 B2 | 10/2017 | Panguluri |
| 9,804,816 B2 | 10/2017 | Panguluri |
| 2001/0048736 A1 | 12/2001 | Walker |
| 2001/0056348 A1 | 12/2001 | Hyde-Thomson |
| 2002/0002032 A1 | 1/2002 | Fleenor |
| 2002/0091524 A1 | 7/2002 | Guedalia |
| 2002/0130898 A1 | 9/2002 | Ogawa |
| 2003/0032419 A1 | 2/2003 | Shibasaki |
| 2003/0070182 A1 | 4/2003 | Pierre |
| 2003/0093784 A1 | 5/2003 | Dimitrova |
| 2003/0130894 A1 | 7/2003 | Huettner |
| 2003/0132953 A1 | 7/2003 | Johnson |
| 2003/0151618 A1 | 8/2003 | Johnson |
| 2003/0158735 A1 | 8/2003 | Yamada |
| 2003/0217061 A1 | 11/2003 | Agassi |
| 2003/0217121 A1 | 11/2003 | Willis |
| 2003/0236905 A1 | 12/2003 | Choi |
| 2004/0215718 A1 | 10/2004 | Kazmi |
| 2004/0237759 A1 | 12/2004 | Bill |
| 2004/0260835 A1 | 12/2004 | Welk |
| 2005/0021500 A1 | 1/2005 | Plastina |
| 2005/0033582 A1 | 2/2005 | Gadd |
| 2005/0097613 A1 | 5/2005 | Ulate |
| 2005/0125148 A1 | 6/2005 | Van Buer |
| 2005/0125232 A1 | 6/2005 | Gadd |
| 2005/0174889 A1 | 8/2005 | Marcantonio |
| 2005/0182675 A1 | 8/2005 | Huettner |
| 2006/0020609 A1 | 1/2006 | LaChapelle |
| 2006/0085182 A1 | 4/2006 | Eves |
| 2006/0085814 A1 | 4/2006 | Okamoto |
| 2006/0092282 A1 | 5/2006 | Herley |
| 2006/0116965 A1 | 6/2006 | Kudo |
| 2006/0143236 A1 | 6/2006 | Wu |
| 2006/0168507 A1 | 7/2006 | Hansen |
| 2006/0195513 A1 | 8/2006 | Rogers |
| 2006/0236847 A1 | 10/2006 | Withop |
| 2006/0265421 A1 | 11/2006 | Ranasinghe |
| 2006/0294212 A1 | 12/2006 | Kikkawa |
| 2007/0016865 A1 | 1/2007 | Johnson |
| 2007/0022156 A1 | 1/2007 | Grubbs |
| 2007/0036289 A1 | 2/2007 | Fu |
| 2007/0050184 A1 | 3/2007 | Drucker |
| 2007/0078729 A1 | 4/2007 | Brown |
| 2007/0192613 A1 | 8/2007 | Amoroso |
| 2007/0198353 A1 | 8/2007 | Behringer |
| 2007/0294222 A1 | 12/2007 | Laurila |
| 2008/0005167 A1 | 1/2008 | Jania |
| 2008/0028094 A1 | 1/2008 | Kang |
| 2008/0046948 A1 | 2/2008 | Verosub |
| 2008/0092182 A1 | 4/2008 | Conant |
| 2008/0133525 A1 | 6/2008 | Ott |
| 2008/0147215 A1 | 6/2008 | Kim |
| 2008/0182670 A1 | 7/2008 | Amron |
| 2008/0189099 A1 | 8/2008 | Friedman |
| 2008/0190267 A1 | 8/2008 | Rechsteiner |
| 2008/0195664 A1 | 8/2008 | Maharajh |
| 2008/0215624 A1 | 9/2008 | Ohashi |
| 2008/0235589 A1 | 9/2008 | Shaw |
| 2008/0256129 A1 | 10/2008 | Salinas |
| 2008/0268772 A1 | 10/2008 | Linnamaki |
| 2009/0063511 A1 | 3/2009 | Myers |
| 2009/0099846 A1 | 4/2009 | Pickering |
| 2009/0125321 A1 | 5/2009 | Charlebois |
| 2009/0158342 A1 | 6/2009 | Mercer |
| 2009/0164429 A1 | 6/2009 | Svendsen |
| 2009/0182704 A1 | 7/2009 | Haskey |
| 2009/0204243 A1 | 8/2009 | Marwaha |
| 2009/0221248 A1 | 9/2009 | Ellis |
| 2009/0222531 A1 | 9/2009 | London |
| 2009/0276064 A1 | 11/2009 | Van Gassel |
| 2009/0326953 A1 | 12/2009 | Peralta Gimenez |
| 2010/0004768 A1 | 1/2010 | Dunning |
| 2010/0063818 A1 | 3/2010 | Mason |
| 2010/0069054 A1 | 3/2010 | Labidi |
| 2010/0070862 A1 | 3/2010 | Partovi |
| 2010/0082346 A1 | 4/2010 | Rogers |
| 2010/0095333 A1 | 4/2010 | Kelly |
| 2010/0114853 A1 | 5/2010 | Fisher |
| 2010/0129058 A1 | 5/2010 | Koyano |
| 2010/0241963 A1 | 9/2010 | Kulis |
| 2010/0251098 A1 | 9/2010 | Rekhi |
| 2010/0268821 A1 | 10/2010 | Pau |
| 2010/0322413 A1 | 12/2010 | Matsushima |
| 2011/0022594 A1 | 1/2011 | Takatsuka |
| 2011/0066941 A1 | 3/2011 | Chipchase |
| 2011/0112671 A1 | 5/2011 | Weinstein |
| 2011/0123176 A1 | 5/2011 | Fujiwara |
| 2011/0167390 A1 | 7/2011 | Reed, Jr. |
| 2011/0285547 A1 | 11/2011 | Crowe |
| 2011/0320443 A1 | 12/2011 | Ray |

(56) References Cited

U.S. PATENT DOCUMENTS

| | | |
|---|---|---|
| 2012/0030230 A1 | 2/2012 | Sheinkop |
| 2012/0057842 A1 | 3/2012 | Caligor |
| 2012/0110126 A1 | 5/2012 | Sparks |
| 2012/0123639 A1 | 5/2012 | Ochiai |
| 2012/0130817 A1 | 5/2012 | Bousaleh |
| 2012/0159336 A1 | 6/2012 | Norwood |
| 2012/0185070 A1 | 7/2012 | Hagg |
| 2012/0203838 A1 | 8/2012 | Zuckerberg |
| 2012/0240045 A1 | 9/2012 | Bradley |
| 2012/0245982 A1 | 9/2012 | Daniel |
| 2012/0253952 A1 | 10/2012 | Rafenomanjato |
| 2013/0022131 A1 | 1/2013 | Ocon |
| 2013/0024287 A1 | 1/2013 | Macneille |
| 2013/0076651 A1 | 3/2013 | Reimann |
| 2013/0103496 A1 | 4/2013 | Shekar |
| 2013/0109340 A1 | 5/2013 | Williams |
| 2013/0198268 A1 | 8/2013 | Hyman |
| 2013/0216055 A1 | 8/2013 | Wanca |
| 2013/0231931 A1 | 9/2013 | Kulis |
| 2013/0253833 A1 | 9/2013 | Tuukkanen |
| 2013/0297599 A1 | 11/2013 | Henshall |
| 2013/0302011 A1 | 11/2013 | Nagorski |
| 2013/0304822 A1 | 11/2013 | Tetreault |
| 2014/0006559 A1 | 1/2014 | Drapeau |
| 2014/0052770 A1 | 2/2014 | Gran |
| 2014/0074846 A1 | 3/2014 | Moss |
| 2014/0074924 A1 | 3/2014 | Yim |
| 2014/0108141 A1 | 4/2014 | Zigler |
| 2014/0115463 A1 | 4/2014 | Reznor |
| 2014/0122080 A1 | 5/2014 | Kaszczuk |
| 2014/0178043 A1 | 6/2014 | Kritt |
| 2014/0245155 A1 | 8/2014 | Jeon |
| 2014/0281973 A1 | 9/2014 | Klappert |
| 2014/0281976 A1 | 9/2014 | Chia |
| 2014/0282755 A1 | 9/2014 | Alsina |
| 2014/0366047 A1 | 12/2014 | Thomas |
| 2015/0062623 A1 | 3/2015 | Yano |
| 2015/0222680 A1 | 8/2015 | Grover |
| 2015/0244805 A1 | 8/2015 | Hampiholi |
| 2015/0254050 A1 | 9/2015 | Panguluri |
| 2015/0254051 A1 | 9/2015 | Panguluri |
| 2015/0255055 A1 | 9/2015 | Panguluri |
| 2015/0255056 A1 | 9/2015 | Panguluri |
| 2015/0262229 A1 | 9/2015 | Brenner |
| 2015/0334170 A1 | 11/2015 | Panguluri |
| 2015/0348532 A1 | 12/2015 | Cameron |
| 2015/0373138 A1 | 12/2015 | Brenner |
| 2016/0066004 A1 | 3/2016 | Lieu |
| 2016/0066140 A1 | 3/2016 | Gnanasekaran |
| 2016/0070527 A1 | 3/2016 | Ricci |
| 2016/0170814 A1 | 6/2016 | Li |
| 2016/0179087 A1 | 6/2016 | Lee |
| 2016/0328471 A1 | 11/2016 | Goldin |
| 2016/0373197 A1 | 12/2016 | Brenner |
| 2016/0373507 A1 | 12/2016 | White |
| 2017/0006128 A1 | 1/2017 | Graham-Cumming |
| 2017/0041680 A1 | 2/2017 | Lewis |
| 2017/0075701 A1 | 3/2017 | Ricci |
| 2017/0115952 A1 | 4/2017 | Gregory |
| 2017/0187862 A1 | 6/2017 | Rahman |
| 2017/0300293 A1 | 10/2017 | Zhao |
| 2017/0344336 A1 | 11/2017 | Lotfizadeh |
| 2018/0088777 A1 | 3/2018 | Dazé |
| 2018/0096064 A1 | 4/2018 | Lennon |
| 2019/0220475 A1 | 7/2019 | Zhang |

FOREIGN PATENT DOCUMENTS

| | | |
|---|---|---|
| KR | 20110117496 A | 10/2011 |
| KR | 20140014664 A | 2/2014 |
| KR | 20140126556 A | 10/2014 |
| WO | 2005050652 A1 | 6/2005 |
| WO | 2015134094 A1 | 9/2015 |
| WO | 2015134097 A1 | 9/2015 |
| WO | 2015134102 A1 | 9/2015 |
| WO | 2015134104 A1 | 9/2015 |
| WO | 2015138601 A1 | 9/2015 |

OTHER PUBLICATIONS

Harris, Melissa, "Pandora-like news radio app about to launch," Chicago Tribune website (http://articles.chicagotribune.com/2013-12-01/business/ct-biz-1201-confidential-levy-20131201_1_traffic-report-traffic-information-app), Dec. 1, 2013, 4 pages.

Printout of website relating to "Rivet News Radio" app, printed Mar. 4, 2014, 2 pages.

Printout of website relating to "Stitcher Radio for Podcasts" app, printed Mar. 4, 2014, 4 pages.

Printout of website relating to "Swell FAQs", printed Mar. 4, 2014, 6 pages.

Printout of website relating to "Swell Radio for News and Podcasts" app, printed Mar. 4, 2014, 3 pages.

* cited by examiner

REAL TIME POPULARITY BASED AUDIBLE CONTENT ACQUISITION

CROSS-REFERENCE TO RELATED APPLICATIONS

This application is a continuation of and claims priority to U.S. patent application Ser. No. 17/361,111, filed Jun. 28, 2021, which is a continuation of and claims priority to U.S. patent application Ser. No. 16/932,005, filed Jul. 17, 2020, which is a continuation of and claims priority to U.S. patent application Ser. No. 16/237,123, filed Dec. 31, 2018, which is a continuation of and claims priority to U.S. patent application Ser. No. 15/223,278, filed Jul. 29, 2016, which is a continuation of and claims priority to U.S. patent application Ser. No. 14/196,908, filed Mar. 4, 2014. The aforementioned applications are hereby incorporated by reference in their entirety.

USAGE AND TERMINOLOGY

In this disclosure, unless otherwise specified and/or unless the particular context clearly dictates otherwise, each usage of "a" or "an" means at least one, and each usage of "the" means the at least one.

TECHNICAL FIELD

This disclosure relates generally to computing devices, and more particularly, to computing devices configured for providing media content such as personalized news programs for instance.

BACKGROUND

Unless otherwise indicated herein, the materials described in this section are not prior art to the claims in this disclosure and are not admitted to be prior art by inclusion in this section.

To listen to the radio, a listener typically tunes a receiver to a particular frequency (e.g., an AM or FM frequency) and listens to music, news, or other audible content being broadcast on that frequency by a radio station. The listener may tune the receiver, and therefore select a radio station, in a variety of ways, such as by rotating a dial, pushing a seek button, or pushing a station preset button. By selecting one of multiple radio stations, the listener may exert some control over the audible content presented to the listener. However, although the listener may control which station is selected, the listener is unlikely to have any influence over the audible content that gets broadcast by the selected station.

Typically, a radio station broadcasts the same audible content to multiple receivers, and therefore to multiple listeners, at the same time. Given this, it is common for a radio station to produce and broadcast audible content that is intended to appeal to a variety of different listeners. However, while some listeners may find such audible content appealing, other listeners may find it unappealing because it is not tailored to their particular interests.

SUMMARY

In one aspect, an example method involves making a determination that a particular news story has a threshold extent of popularity. The example method can also involve, responsive to making the determination, transmitting to a remote recording station a request for a recording of a verbal reading of a text-based version of the particular news story. The example method can also involve receiving the requested recording from the remote recording station.

In another aspect, an example system includes a communication interface and a controller. The controller can be configured to perform operations. The operations can include: (i) making a determination that a particular news story has a threshold extent of popularity; (ii) responsive to making the determination, transmitting to a remote recording station, via the communication interface, a request for a recording of a verbal reading of a text-based version of the particular news story; and (iii) receiving, via the communication interface, the requested recording from the remote recording station.

In another aspect, an example non-transitory computer-readable medium storing instructions that, when executed by a processor, cause performance of operations. The operations can include making a determination that a particular news story has a threshold extent of popularity. The operations can also include, responsive to making the determination, transmitting to a remote recording station a request for a recording of a verbal reading of a text-based version of the particular news story.

In another aspect, an example method involves making a determination that a particular media content item has a threshold extent of popularity. The example method can also involve, responsive to making the determination, transmitting to a remote recording station a request for a recording of a verbal reading of a text-based version of the media content item. The example method can also involve receiving the requested recording from the remote recording station.

These, as well as other aspects, advantages, and alternatives, will become apparent to those of ordinary skill in the art by reading the following detailed description, with reference where appropriate to the accompanying drawings.

DETAILED DESCRIPTION

I. Overview

Figure 1:
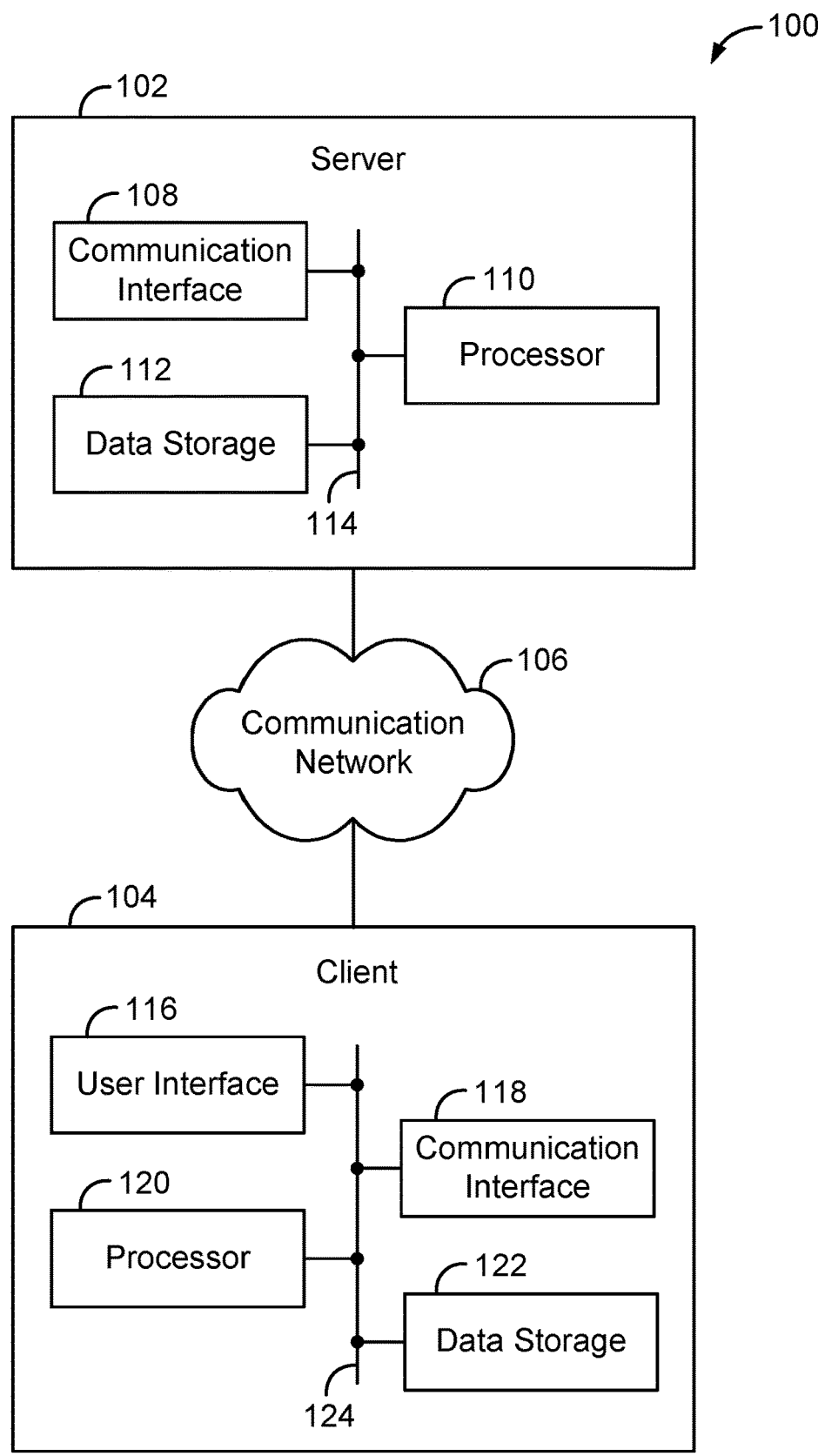
FIG. 1 is a simplified block diagram of an example system.

As indicated above, a radio station may produce and broadcast audible content that is intended to appeal to a variety of different listeners. For example, in the context of producing and broadcasting a news program, a narrator (such as a news anchor affiliated with the radio station, or another person) may read aloud news stories from each of a variety of different predetermined categories, such as sports, politics, and entertainment, and the readings may be included as part of the news program.

Although some listeners may be interested in audible versions of news stories from all of the predetermined categories, other listeners may have different interests. For example, one listener may be interested in sports and entertainment, but not politics, while another listener may be interested in politics and entertainment, but not sports. In either case, the listener may be presented with audible content that does not align with the listener's interests. As a result, the listener may find the news program unappealing.

One way to help address this issue is by implementing a system that provides a user with a personalized news program. In one aspect, such a system may include at least two computing devices, such as a server and a client, and a communication network through which the server and the client may communicate.

In this system, the server and the client may perform a variety of functions. For example, the server may determine a set of attributes associated with a user of the client and may use the determined set of attributes as a basis to generate a playlist of a personalized news program for the user. The generated playlist may define a sequence of media content items, each of which may include audible content such as an audible version of a news story. An audible version of a news story may be referred to herein as an "audible news story." The generated playlist may also specify media content attribute data respectively for each media content item, including for instance a reference to data representing the media content item and metadata characterizing the media content item. Collectively, this sequence of media content items may thus define a personalized news program for playout to the user.

After or as the server generates this playlist, the server may transmit the playlist to the client, and the client may traverse the entries of the playlist, retrieve data representing each referenced media content item, and use the data to play out each referenced media content item in accordance with the sequence defined by the playlist. In practice, for instance, for each media content item of the sequence, (i) the client may transmit to the server, or to another server for that matter, a request for data representing the media content item, (ii) the server may receive the transmitted request, (iii) responsive to the server receiving the transmitted request, the server may transmit to the client, the requested data, (iv) the client may receive the transmitted data, and (v) the client may play out for the user the media content item represented by the received data.

Optimally, this process may involve streaming of the data representing the media content items to the client and playout of the sequence of media content items in real time by the client. In particular, for each media content item referenced by the playlist, the client may request a server to stream the data representing the media content item to the client, and the client may then receive in response a data stream defining the requested media content item. As the client receives and buffers the requested data representing the media content items in sequence, the client may then play out the represented media content items to a user, thus providing the user with a substantially continuous playout of the media content items defining the personalized news program.

As noted above, a media content item, and therefore an audible version of a news story may be represented by data. Data representing an audible version of a given news story may be generated in a variety of ways. For instance, the data may be generated by recording a human's verbal reading of a text-based version of the news story. Data generated in this manner may be referred to herein as "recorded voice data." Alternatively, the data may be generated via a text-to-speech (TTS) system based on data representing the text-based version of the news story. Data generated in this manner may be referred to herein as "TTS data." Upon a server receiving a request from a client for data representing an audible version of a news story, the server can fulfill the request by sending the available representative data (e.g., recorded voice data or TTS data) to the client.

To acquire recorded voice data for a given news story, the server may transmit a request to a remote recording station. A narrator at the remote recording station can then read aloud a text-based version of the news story into a microphone, at which point the recorded voice data can be recorded and transmitted to the server. Upon receipt at the server, the server can store the recorded voice data and distribute it to various clients to fulfill requests for data representing an audible version of the news story.

To acquire TTS data for a given news story, the server may provide data representing a text-based version of the news story to a TTS system. The TTS system may then analyze the provided text and create and output the corresponding TTS data. In one example, the TTS system may incorporate a variety of software-implemented and/or hardware-implemented logic instructions in combination with synthesizers and/or function generators that function to create TTS data. The server may then store the TTS data and use the TTS data to fulfill requests for data representing an audible version of the news story.

In practice, an audible news story represented by recorded voice data may be preferred to an audible news story represented by TTS data. Among other factors, listeners may find that the tone, cadence, and/or speech patterns represented by recorded voice data are more pleasant than those represented by TTS data, and therefore the recorded voice data may be preferentially provided by the server.

In view of this, the server may request recorded voice data for certain news stories. However, in practice, the system's capacity to record news stories is limited by the availability of narrators, and so the server may preferentially request recorded voice data for the most popular news stories. For example, the server can make a determination that a particular news story has a threshold extent of popularity. And responsive to making such a determination, the server can transmit to a remote recording station a request for a recording of a verbal reading of a text-based version of the particular news story. At the remote recording station, a narrator can read the text-based version of the particular news story aloud, and the remote recording station can create a recording of such reading (i.e., generate recorded voice data). The server can then receive the requested recorded voice data from the remote recording station.

In some examples, the server may determine the extent of popularity of certain news stories based on an extent of popularity of an audible version of the news story, where the audible version is represented by TTS data. In such instances, the server may determine the extent of popularity of the audible version of the news program based on an analysis of generated playlists of personalized news programs for various users. For instance, the server may assign rankings to certain audible news stories based on their selection in connection with the generated playlists. Other factors related to the selection of audible news stories may also be used to determine the extent of popularity of a given audible news story.

In addition, the server may request recorded voice data from a particular one of multiple remote recording stations based on various factors, such as the availability of a narrator at the particular remote recording stations and/or based on a relationship between the news story and the geographic location of the particular remote recording station. The server may also send requests to several remote recording stations simultaneously by sending a ranked list of the news stories for which recorded voice data is desired. The list can be ordered in accordance with the relative priority of receiving recorded voice data for each news story. The remote recording stations may then individually select respective news stories for recordation, and communicate amongst each other and/or with the server to coordinate efforts and prevent duplicative recordings from being created at multiple recording stations. As stories are selected from the list, the server may re-order the remaining stories and update the recording stations as appropriate.

Thus, in some instances, the server and the various remote recording stations can operate to generate recorded voice data of the most popular news stories, as determined in real time. For example, a server may determine a news story's extent of popularity on the basis of the selection (or near selection) of an audible version of the news story in connection with generating playlists of personalized news programs.

II. Example System

FIG. 1 is a simplified block diagram of an example system 100 in which aspects of the present disclosure can be implemented. As shown, the system 100 includes at least two computing devices, namely a server 102 and a client 104, and a communication network 106. Generally, the server 102 and the client 104 are configured for communicating with each other via the communication network 106.

A. Server

The server 102 may be configured for performing a variety of functions, such as those described in this disclosure (including the accompanying drawings). For example, the server 102 may be configured for establishing and transmitting to the client 104 a playlist defining a sequence of media content items that may define a personalized news program for instance, and for streaming data representing various media content items to the client 104 via the communication network 106 such that the client 104 may playout the represented media content items.

The server 102 may take a variety of forms and may include various components, including for example, a communication interface 108, a processor 110, and a data storage 112, all of which may be communicatively linked to each other via a system bus, network, or other connection mechanism 114.

The communication interface 108 may take a variety of forms and may be configured to allow the server 102 to communicate with one or more devices according to any number of protocols. For instance, the communication interface 108 may be configured to allow the server 102 to communicate with the client 104 via the communication network 106. In one example, the communication interface 108 may take the form of a wired interface, such as an Ethernet interface. As another example, the communication interface 108 may take the form of a wireless interface, such as a cellular or WI-FI interface.

The processor 110 may include a general purpose processor (e.g., a microprocessor) and/or a special purpose processor (e.g., a digital signal processors (DSP)).

The data storage 112 may include one or more volatile, non-volatile, removable, and/or non-removable storage components, such as magnetic, optical, or flash storage, and may be integrated in whole or in part with the processor 110.

Further, the data storage 112 may take the form of a non-transitory computer-readable storage medium, having stored thereon program instructions (e.g., compiled or non-compiled program logic and/or machine code) that, when executed by the processor 110, cause the server 102 to perform one or more functions, such as those described in this disclosure.

B. Client

Likewise, the client 104 may be configured for performing a variety of functions such as those described in this disclosure. For example, the client 104 may be configured for receiving from the server 102 a playlist defining a sequence of media content items to be played out by the client, traversing the entries of the playlist, retrieving the data representing each referenced media content item, and using the retrieved data to play out each referenced media content item in accordance with the sequence defined by the playlist The client 104 may take a variety of forms, including for example, a mobile phone, tablet, laptop, media player, gaming device, wearable device, or vehicle. And the client 104 may include various components, including for example, a user interface 116, a communication interface 118, a processor 120, and a data storage 122, all of which may be communicatively linked with each other via a system bus, network, or other connection mechanism 124.

The user interface 116 may be configured for facilitating interaction between the client 104 and a user of the client 104, such as by receiving input from the user and providing output to the user. Thus, the user interface 116 may include input components such as a computer mouse, a keyboard, a touch-sensitive panel, or perhaps a microphone for receiving voice commands. In addition, the user interface 116 may include output components such as a display screen (which, for example, may be combined with a touch-sensitive panel) a sound speaker or other audio output mechanism, and a haptic feedback system. Furthermore, the user interface 116 may include a digital-analog conversion unit to facilitate playout of media content to a user. Moreover, the client 102 may provide output to the user via another user interface system (e.g., the client 102 may communicate with an audio output system via a short range wireless communication, such as a connection established in accordance with IEEE 802.15).

The communication interface 118 may take a variety of forms and may be configured to allow the client 104 to communicate with one or more devices according to any number of protocols. For instance, the communication interface 118 may be configured to allow the client 104 to communicate with the server 102 via the communication network 106. Further, the communication interface 118 may take the form of a wired or wireless interface.

The processor 120 may include a general purpose processor and/or a special purpose processor. The data storage 122 may include one or more volatile, non-volatile, removable, and/or non-removable storage components, and may be integrated in whole or in part with the processor 120. Further, the data storage 122 may take the form of a non-transitory computer-readable storage medium, having stored thereon program instructions that, when executed by the processor 120, cause the client 104 to perform one or more functions, such as those described in this disclosure. Such program instructions may define or be part of a discrete software application, such a native app or web app, that can be executed upon user request for instance.

C. Communication Network

Generally, the communication network 106 may be configured to allow the server 102 and the client 104 to communicate with each other using any number of protocols. In addition, the communication network 106 may take a variety of forms, including for example a packet-switched network such as the Internet.

III. Example Operations

Methods of this disclosure will now be described principally in connection with providing a personalized news program to a user of the client 104. It will be understood, however, that this disclosure can extend to apply with respect to providing other types of media content as well, not necessarily limited to personalized news programs.

Figure 2:
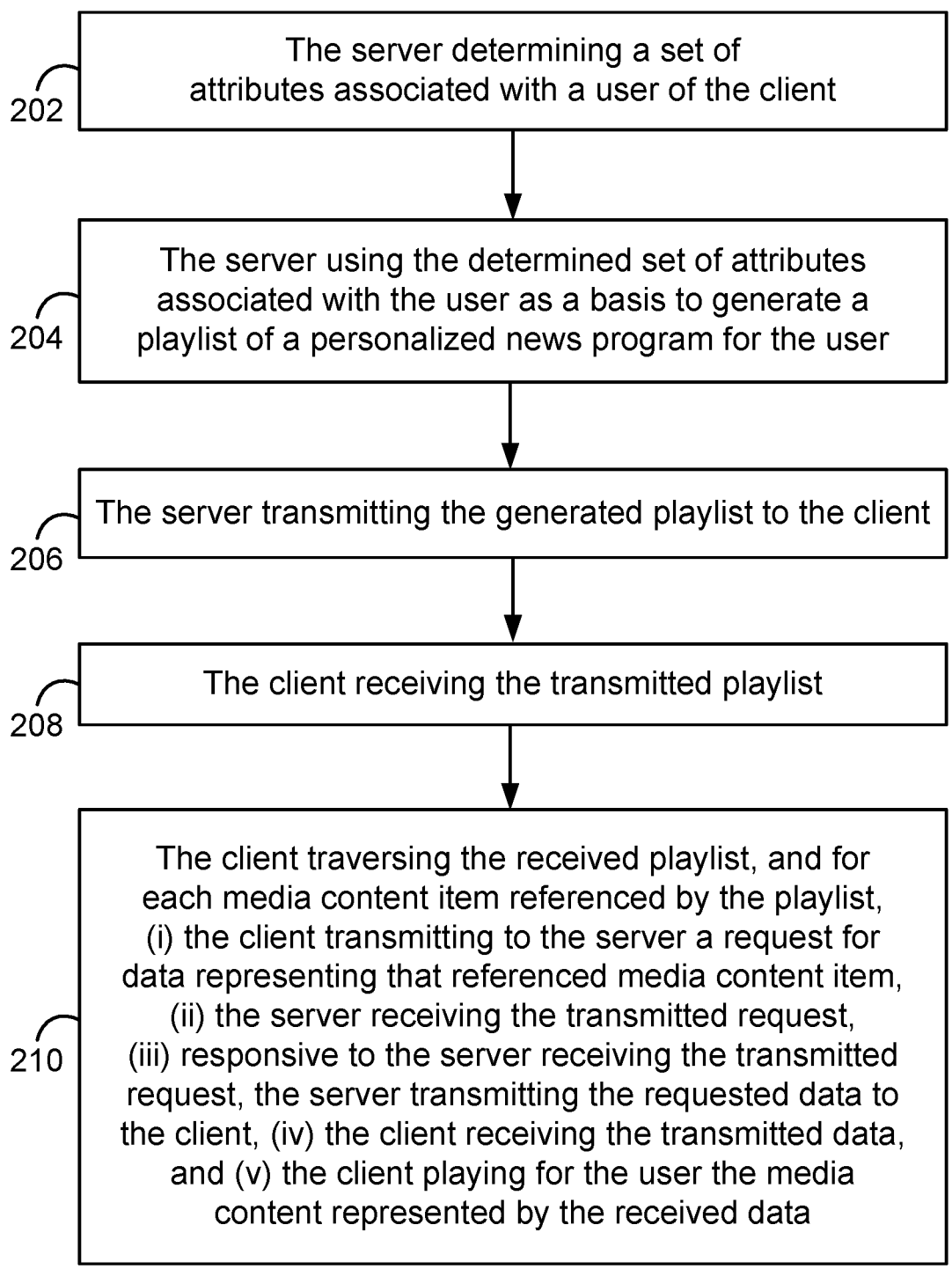
FIG. 2 is a flow chart depicting functions of an example method.

FIG. 2 is a flow chart depicting functions that can be carried out in an example method for providing a user of the client 104 with a personalized news program. At block 202, the example method involves the server 102 determining a set of (i.e., one or more) attributes associated with a user of the client 104. At block 204, the method then involves the server 102 using the determined set of attributes as a basis to generate a playlist of a personalized news program for the user. At block 206, the method then involves the server 102 transmitting the generated playlist to the client 104, and at block 208, the method involves the client 104 receiving the transmitted playlist. At block 210, the method then involves the client 104 traversing the received playlist, and for each media content item referenced by the playlist, (i) the client transmitting to the server a request for data representing that referenced media content item, (ii) the server receiving the transmitted request, (iii) responsive to the server receiving the transmitted request, the server transmitting the requested data to the client, (iv) the client receiving the transmitted data, and (v) the client playing for the user the media content item represented by the received data.

In this process, each user-associated attribute that the server 102 determines may take various forms. By way of example, each attribute may relate to one or more of the following: the user's extent of interest in a particular type of news story, the user's interest in a particular type of audible news story, whether the user has a subscription to a news-related product or service (e.g., a newspaper subscription), the user's age, the user's gender, the user's current location, the user's destined location (e.g., a location to which the user is driving), the weather at the user's current location, the weather at the user's destined location, and the user's estimated travel time between the user's current location and the user's destined location.

Further, the function of the server 102 determining the set of attributes associated with the user may take various forms. In one example implementation, for instance, the server 102 may receive from the client 104 an identification of the user of the client 104, and the server 102 may then refer to one or more data sources that correlate or facilitate correlation of that identification with an attribute, so as to determine an attribute associated with the user. And in another example implementation, the client 104 itself may determine a user-associated attribute and may report the determined attribute to the server 102, in which case the server would determine the user-associated attribute by receiving the reported attribute from the client 104. To facilitate this, the client 104 may provide a configuration interface through which the user can manually enter or select a user-associated attribute, and the client 104 may thus determine the user-associated attribute by receiving user indications of the user-associated attribute through that interface. Alternatively or additionally, the client 104 may determine a user-associated attribute by evaluating information associated with the user, such as user profile records, browsing history, shopping history, location history and the like. Other examples are possible as well.

For this purpose, the client 104 may determine the attribute associated with the user in a variety of ways. As one example, the client 104 may receive the attribute as input from the user. As another example, the client 104 may receive other input from the user, and the client 104 may use the input as a basis to determine the attribute. For instance, the client 104 may receive input from the user, such as the user's destened location, and the client 104 may use a positioning device and a navigation software application to determine the user's estimated travel time from the user's current location to the user's destined location. In some instances, the client may communicate with the server 102 or another server, such as a server affiliated with the mapping application, to determine such an attribute. Other example techniques for determining an attribute associated with a user are possible as well.

The server 102 may then use the determined set of attributes associated with the user in various ways to generate the playlist of the personalized news program for the user. For instance, based on the set of user-associated attributes, the server 102 may select particular audible news stories or types of audible news stories to specify as media content items in the playlist. As such, the server 102 may be configured with data that maps particular sets of user-associated attributes with particular types of audible news stories, possibly giving more weight to inclusion of certain types of audible news stories than to other types of audible news stories. For example, the data may indicate that a particular set of user-associated attributes suggests more likely user interest in entertainment news than in politics news, in which case the server 102 may structure the playlist to specify a greater extent of entertainment-related audible news stories than politics-related audible news stories. As another example, the data may indicate that a particular set of user-associated attributes suggests great user interest in sports, in which case the server 102 may structure the playlist to specify a relatively great extent of sports-related audible news stories.

In some examples, an audible news story's type may be defined by a set of attributes associated with the audible news story, examples of which may include or relate to one or more of the following: the audible news story's category, the audible news story's target demographic (e.g., by age, gender, or location), the audible news story's creation date, the audible news story's author or other attribution information, the extent of popularity of the audible news story, the extent of popularity of a person or topic related to the audible news story, or the manner in which data representing the audible news story was generated.

These attributes may be stored in a variety of ways. For example, they may be stored as metadata along with the data representing the audible news story to which they correspond. These attributes may also be set in a variety of different ways, such as by a user via a user interface.

As indicated above, a media content item such as an audible news story may be represented by data. This data may be generated in a variety of ways. For example, the server 102 may generate data representing an audible news story by recording a narrator reading aloud a text-based version of the news story, or by using a well-known TTS software and/or hardware system to convert data representing a text-based version of a news story into data representing an audible version of the news story. Further, data representing a media content item may be stored in a variety of ways. For example, the data may be stored in the form of a digital audio file in a data storage, such as the data storage 112.

In one implementation, the function of the server 102 using the determined set of attributes associated with the user as a basis to generate a playlist of a personalized news program for the user may involve the server 102 (*i*) using the determined set of attributes associated with the user as a basis to select a playlist template from a group of templates (e.g., stored in the data storage 112), (ii) using the selected playlist template as a basis to select a set of audible news stories from a group of audible news stories (e.g., stored in the data storage 112), and (iii) generating a playlist that includes references to each audible news story from the selected set of audible news stories.

Generally, a playlist template serves as an outline for a playlist and may define a sequence of placeholders for media content attribute data and/or media content attribute data itself. For each placeholder, the playlist template may further specify placeholder attribute data. Based on this placeholder attribute data, the server 102 may select a set of audible news stories, and replace that placeholder with media content attribute data for the selected set of audible news stories, thereby converting the playlist template into a playlist.

There may be a variety of different types of placeholder attribute data, examples of which may include a quantity tag and a type tag. A quantity tag specifies a quantity of audible news stories that the server 102 should select for the corresponding placeholder. And the type tag specifies the particular types of audible news stories that the server 102 should select for the corresponding placeholder.

As indicated above, a playlist template may define a sequence of placeholders for media content attribute data and/or media content attribute data itself. In the case where the sequence defines media content attribute data, the server 102 may forgo selecting a set of audible news stories for that entry as the server 102 generates the playlist and instead use the media content attribute data provided in the playlist template.

In line with the discussion above, the playlist that the server 102 generates may define an ordered sequence of entries, each of which provides media content attribute data regarding a respective media content item, such as a particular audible news story. In practice, the playlist may provide this information in various ways, such as with use of extensible markup language (XML) for instance, in a manner that the client 104 would be configured to read.

For a given media content item, the media content attribute data may include a reference to the data representing the media content item, such as a network address or content identifier that the client 104 can read and use as a basis to request and receive the data representing the media content item for playout of the represented media content item. Thus, the client 104 may read the reference indicated for a given media content item to determine a network address or the like from which to obtain the data representing the media content item, and the client 104 may request and receive the data representing the media content item from that network address or by otherwise using the indicated reference.

Such a reference may have various levels of granularity. By way of example, the reference may be specific to data representing a particular audible news story, by specifying a particular story identifier or name of a news story media file for instance, in which case the client 104 could request the server 102 to transmit that data representing that particular audible news story and the server 102 could retrieve that data representing that particular audible news story from data storage and transmit it to the client 104. And as another example, the reference may be more general, specifying a class of news story, such as "traffic" or "weather" for instance, in which case the client 104 could request the server 102 to transmit data representing an audible news story of that class generally, and the server 102 may then retrieve data representing a latest or most pertinent audible news story of that class and transmit it to the client 104. Further, any or all of these references may refer to locations other than server 102, such as to one or more other servers for instance.

Further, the server 102 may transmit the generated playlist to the client 104, and the client 104 may receive the generated playlist, in various ways. By way of example, the client 104 may transmit to the server 102 a hypertext transfer protocol (HTTP) request or the like seeking the playlist, and the server 102 may respond by generating the playlist and transmitting the playlist to the client 104 in an HTTP response or the like.

Continuing with reference to FIG. 2, as noted above, at block 210, the method involves the client 104 traversing the received playlist, and for each media content item of the sequence, (i) the client transmitting to the server, a request for data representing the media content item, (ii) the server receiving the transmitted request, (iii) responsive to the server receiving the transmitted request, the server transmitting to the client, the requested data, (iv) the client receiving the transmitted data, and (v) the client playing out for the user the media content item represented by the received data.

As further noted above, this process may involve streaming of the data representing the media content item from the server 102, or from one or more other servers, to the client 104. In practice, for instance, as the client 104 traverses the playlist, the client 104 may read each successive entry to determine the reference that the entry specifies for a media content item, and the client may transmit to the server 102 a request for the server 102 to stream the data representing that media content item to the client 104. To facilitate this, the client 104 may engage in signaling with the server 102 in accordance with the Real Time Streaming Protocol (RTSP), to establish a streaming media session and to specify the data representing the media content to be streamed, and the server 102 may stream the requested data to the client 104 in accordance with the Real-time Transport Protocol (RTP). As the client 104 receives this streamed data, the client 104 may then buffer and play out the content represented by the data in real time, providing the user with substantially continuous playout of the news program.

Figure 3:
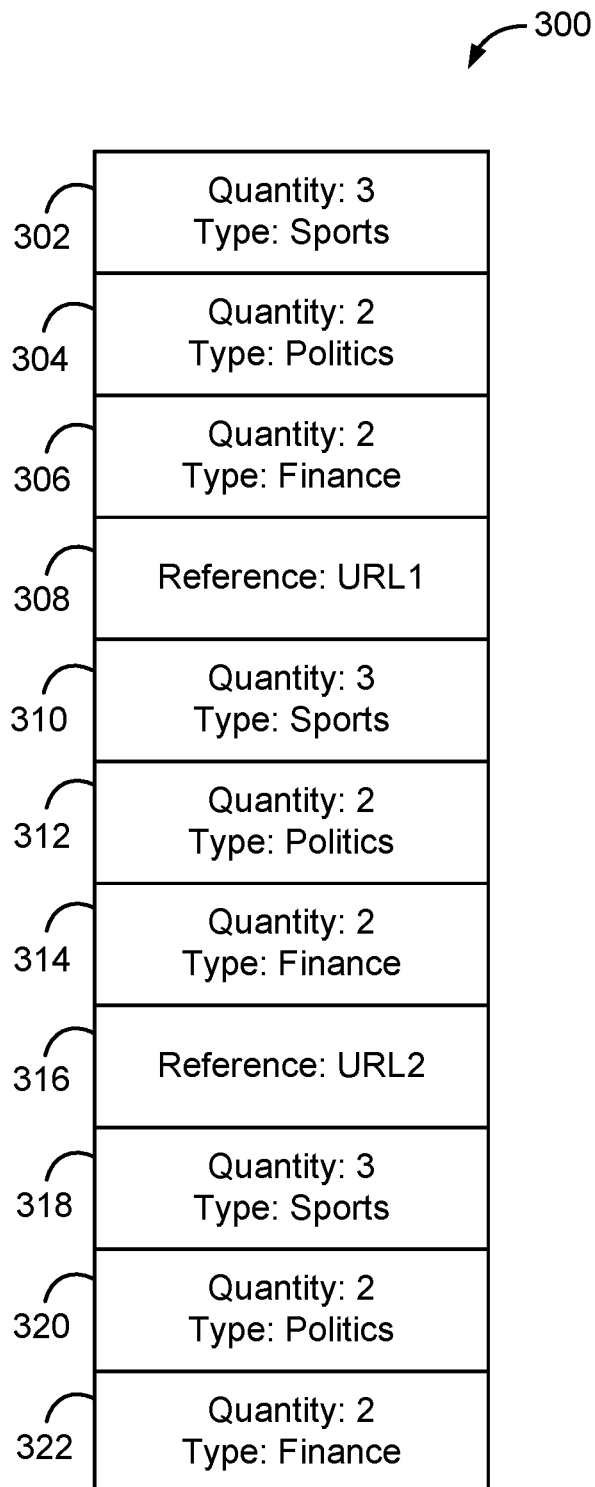
FIG. 3 is a diagram of an example playlist template.

To help appreciate operation of this process, FIG. 3 shows an example playlist template 300. The template 300 includes eleven ordered entries 302-322 (even numbers only). Each of the entries 302, 304, 306, 310, 312, 314, 318, 320, and 322 serves as a placeholder for media content attribute data. And each of those entries includes placeholder attribute data, namely a quantity tag and a type tag. For example, the entry 302 includes a quantity tag that specifies "3" and a type tag that specifies a "Sports" category type. As another example, the entry 304 includes a quantity tag that specifies "2" and a type tag that specifies a "Politics" category type. Further, each of the entries 308 and 316 include media content attribute data. In particular, the entry 308 includes the reference "URL1" and the entry 316 includes the reference "URL2."

As indicated above, at block 204, the method may involve the server 102 using the selected playlist template as a basis to select a set of audible news stories from a group of audible news stories (e.g., stored in the data storage 112). This may involve, for each entry that serves as a placeholder of media content attribute data, the server 102 using the quantity and type tags of that entry as a basis to select a set of audible news stories. For example, for the entry 302, the server 102 may select a set of 3 audible news stories that are all associated with a sports category attribute. As another example, for the entry 304, the server 102 may select a set of 2 audible news stories that are all associated with a politics category attribute.

Additionally or alternatively, the server 102 may determine an attribute associated with an audible news story, and the server 102 may use the determined attribute as a basis to select the set of audible news stories from the group of audible news stories.

As noted above, block 204 may involve generating a playlist that includes references to each audible news story from the selected set of audible news stories. This may involve the server 102 replacing placeholders of the playlist template with the appropriate selected sets of audible news stories, and thereby generating a playlist by "converting" the playlist template into a playlist.

Figure 4:
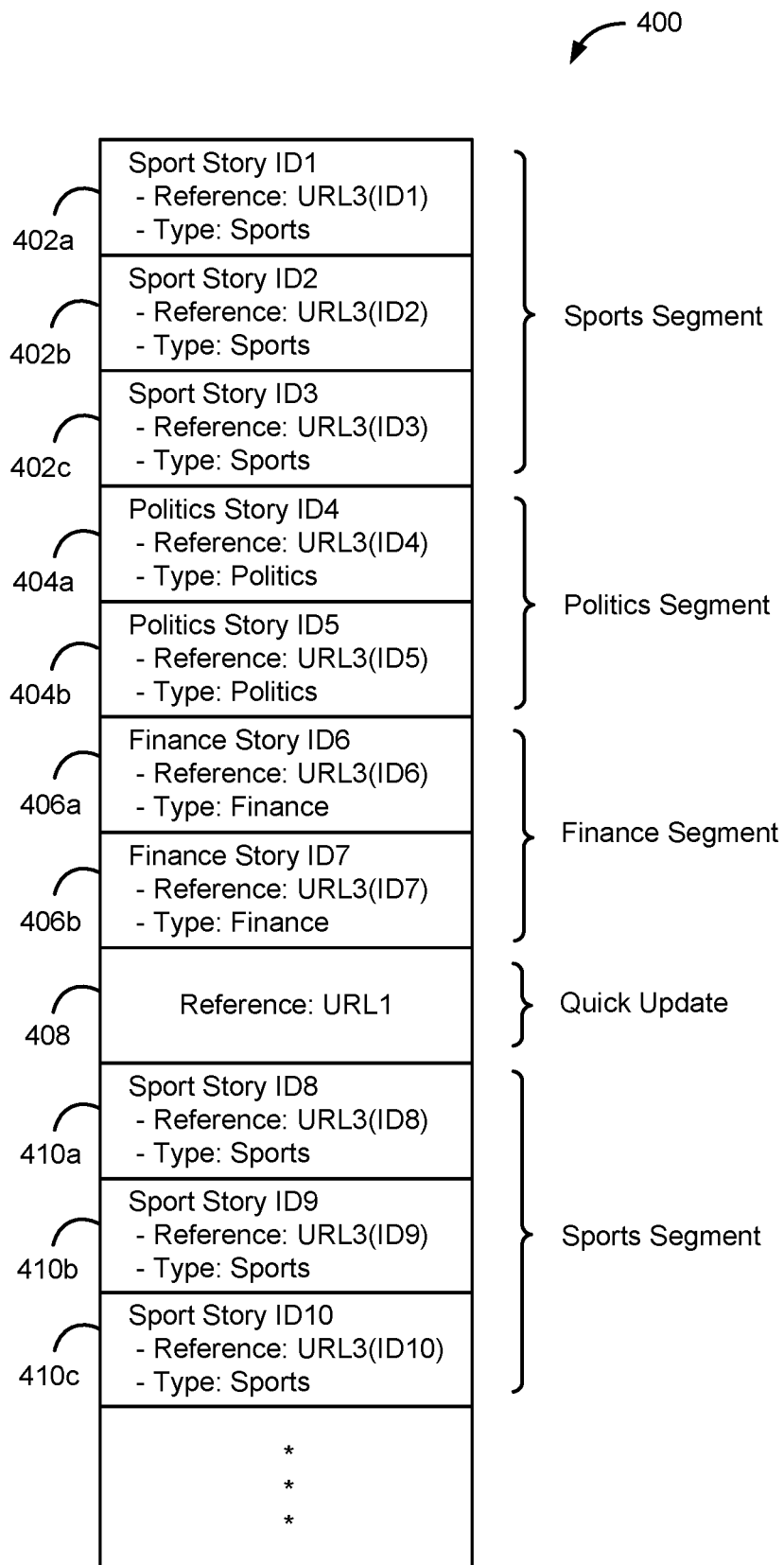
FIG. 4 is a diagram of an example playlist.

FIG. 4 shows a portion of an example playlist 400 that the server 102 may generate after the server 102 selects the playlist template 300. As shown, the generated playlist 400 include entries 402a-c, 404a-b, 406a-b, and 410a-c, each of which is for a respective audible news story and designates a respective reference and category type. For example, entry 402a designates a "Sports Story ID1," with a reference in the form of "URL3" that may point to the server 102 and that designates "ID1" as a query parameter or the like, and with a category type indication of "Sports." Entry 402b then designates a "Sports Story ID2," with a reference in the form of "URL3" that may point to the server 102 and that designates "ID2" as a query parameter, and with a category type indication of "Sports." And entry 402c designates a "Sports Story ID3," with a reference in the form of "URL3" that may point to the server 102 and that designates "ID3" as a query parameter, and with a category type indication of "Sports." As shown, this portion of the playlist 400 may be referred to as the "Sports Segment."

As another example, entry 404a designates a "Politics Story ID4," with a reference in the form of "URL3" that may point to the server 102 and that designates "ID4" as a query parameter, and with a category type indication of "Politics." And entry 404b designates a "Politics Story ID5," with a reference in the form of "URL3" that may point to the server 102 and that designates "ID5" as a query parameter, and with a category type indication of "Politics." As shown, this portion of the playlist 400 may be referred to as the "Politics Segment."

Since the entry 308 of the playlist template 300 included media content attribute data, namely the reference URL1, the server 102 may "carry though" the media content attribute data from the playlist template 300 to the playlist 400 as the server 102 generates the playlist 400. Accordingly, the entry 408 indicates the reference "URL3." As shown, this portion of the personalized news program may be referred to as a "quick update." In one example, a quick update may provide relatively small portions of data-centric information (e.g., traffic or weather information) to break up two segments in the personalized news program.

For brevity, FIG. 4 does not show additional entries after 410c, but it should be apparent that the server 102 may generate the remainder of the playlist 400 using the techniques described above.

IV. Audible Content Acquisition

Figure 5:
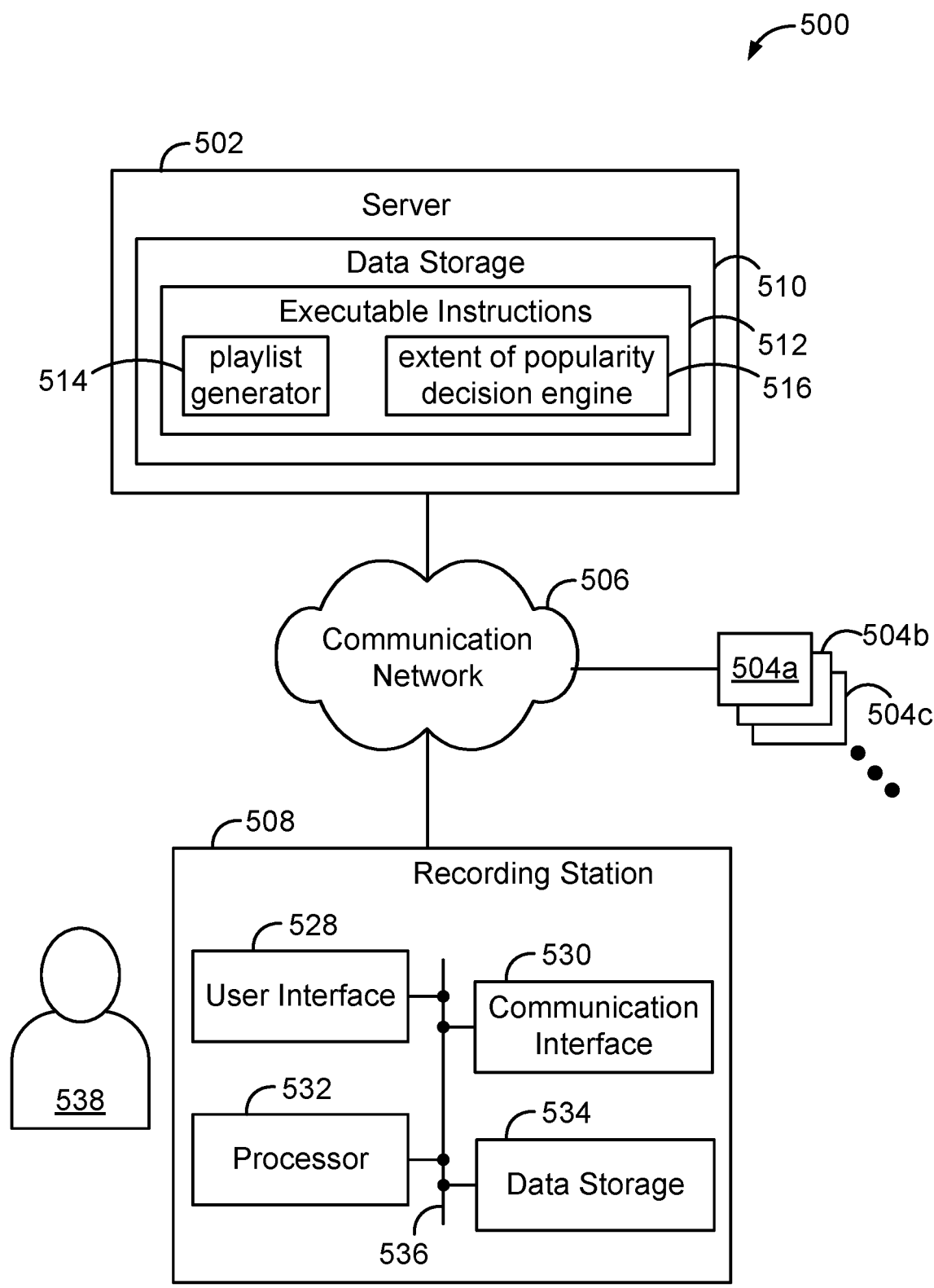
FIG. 5 is a simplified block diagram of another example system.

FIG. 5 is a diagram of a system 500 that may facilitate recorded voice data acquisition for a personalized news service. The personalized news service may generate and provide personalized news programs to users. The system 500 includes a server 502, clients 504a, 504b, 504c, etc., each client being associated with an individual user, and a remote recording station 508. The server 502 may communicate with the clients 504a-c and with the recording station 508 through a communication network 506. Each of the server 502, the clients 504a-504c, and the communication network 506 may be the same as or similar to the server 102, the client 104, and the communication network 106, respectively, as described above in connection with FIG. 1. Although there may be some differences from the systems of FIG. 1, as described herein.

In some instances, the server 502 functions to obtain data representing an audible version of a news story. As described above, this data may be recorded voice data or TTS data. To acquire recorded voice data, the server 502 may submit a request for recorded voice data to the recording station 508. To acquire TTS data, the server 502 may generate TTS data using a TTS system included in or associated with the server 502.

A. Recording Station

The recording station 508 may take a variety of forms and may include various components, including for example, a user interface 528, communication interface 530, a processor 532, and a data storage 534, all of which may be communicatively linked to each other via a system bus, network or other connection mechanism 536.

The user interface 528 may facilitate interaction between the recording station 508 and a narrator 538. In practice, the user interface 528 may function to provide information to the narrator 538 via an output interface or receive input from the narrator 538 via an input interface. For example, the user interface 528 may include a display that can be used to display a script of the text-based news story for the narrator 538 to read aloud. The user interface 528 may also include a microphone (or another transducer) that generates audio frequency electrical signals from the sound waves provided by the narrator's voice while reading the news story. The audio frequency electrical signals can then be saved in the data storage 534 as recorded voice data, and the data can be transmitted to the server 502 through the communication network 506 using the communication interface 530. Other user interactive modules may also be included in the user interface 528.

The communication interface 530 may allow the recording station 508 to communicate with one or more devices according to any number of protocols. For example, the communication interface 530 can send and receive communications to and from the server 502 over the communication network 506. The processor 532 may include a general purpose and/or a special purpose processor. The data storage 534 may include one or more volatile, non-volatile, removable, and/or non-removable storage components, and may be integrated in whole or in part with the processor 532. Further, the data storage 534 may include program instructions that, when executed by the processor 532, cause the recording station 508 to function as described herein.

In some examples, the recording station 508 may include or be integrated with a recording booth or sound stage at a news studio that is remote from the server 502. The news studio may be a facility from which live televised or radio news programs are produced and/or broadcast, and may include a number of sets, cameras, and other items involved with producing live news broadcasts. In addition, the news studio may include the narrator 538 who may be skilled in reading news stories in a manner that is pleasing to a listening audience (e.g., the users of the client devices 504a-c). Among other aspects, the narrator 538 may be a person capable of reading a text-based news story while using speech patterns, cadence, tone, and the like that listeners may find desirable.

In practice, the recording station 508 may function to receive a request for a recording of a verbal reading of a text-based version of a particular news story, via the communication interface 530. The recording station 508 may then notify the narrator 538 of the request via the user interface 528. The recording station 508 may also function to render text of the text-based version of the news story for the narrator 538 to read aloud via the user interface 528. Upon receiving an input indicating the narrator 538 is ready to begin recording, which may be provided by a technician or another person, the recording station 508 can function to begin recording the narrator 538 while the narrator 538 reads the news story aloud. The recording station 508 can then transmit the recorded voice data back to the server 502.

B. Server

The server 502 includes a data storage 510 that can be a non-transitory computer-readable medium implemented with a variety of technologies and used to store both executable instructions 512 as well as other data. Similar to the server 102, the server 502 also includes a processor that can execute the executable instructions 512 to thereby cause the server 502 to perform operations. The server 502 can also include a communication interface that the server 502 uses to communicate with other devices over the communication network 506. Certain functionality of the server 502 is described in connection with software modules 514 and 516 included in the executable instructions 512, although it is understood that the functionality of the server 502 may be implemented by hardware, software, and/or firmware functional modules. Moreover, some operations may involve one or more additional computing systems in communication with the server 502. For instance, some operations may be performed by another computing system in response to a request from the server 502, and the other computing system may provide results to the server 502.

The data storage 510 can store various types of data such as data representing attributes associated with users of the personalized news service (e.g., users associated with the devices 504a, 504b, 504c, etc.), data representing text-based versions of news stories, data representing audible versions of news stories, and metadata characterizing a given version of a news story. As indicated above, in one example, metadata for an audible news story may include an indication of the manner in which data representing the audible news story was generated (e.g., whether the data is recorded voice data or TTS data).

In some cases, the data storage 510 may include data representing a text-based version of a news story, and may further include data representing an audible version of that same news story. In such instances, these portions of data may be associated with each other. For example, a lookup reference, such as a pointer or other correlation data, can be included as part of the data representing the text-based version of the news story to refer to the data representing the audible version of the news story. The lookup reference can thereby associate a text-based version of a news story with a corresponding audible version of the same news story.

Among other applications, such a lookup reference may be included in the playlists of personalized news programs generated for various users. The lookup reference can then be used by the clients 504a-c to request the server 502 to stream data representing the particular audible news story for playback. Employing such lookup references may allow for a static lookup reference for a given text-based version of a news story to be used to refer to a dynamically updated audible version of the same news story. For example, a lookup reference for a given news story may initially refer to TTS data, but upon acquiring recorded voice data for the news story, the lookup reference may be updated to refer to the recorded voice data rather than the TTS data. Other examples of associating text-based versions of news stories with audible versions of news stories are also possible, including via a number of different data structures.

Referring again to the functional modules 514 and 516, the server 502 can have a personalized news program playlist generator module 514 and an extent of popularity decision engine module 516. For brevity, the personalized news program playlist generator module 514 is referred to herein as the playlist module 514, and the extent of popularity decision engine module 516 is referred to herein as the popularity module 516. Moreover, as noted above, while illustrated as software-implemented modules included in the executable instructions 512 of the data storage 510, any of the functional modules may include software-implemented, hardware-implemented, and/or firmware-implemented aspects that coordinate to provide the functions described herein alone or in combination with other computing systems.

The playlist module 514 can generate a personalized combination of news stories for a user, such as the user associated with client 504a. The playlist module 514 may function the same as, or similarly to, the operation of the server 102 to generate the playlist 400 as described in connection with FIGS. 2-4. In practice, the playlist module 516 may receive a request to generate a playlist of a personalized news program from the client 504a. The playlist module 514 may then select a group of audible news stories and populate a playlist with references to data representing the selected audible news stories (e.g., among the data representing audible news stories in the data storage 510).

The playlist module 514 may select audible news stories based on a correspondence between attributes associated with the user and attributes associated with the audible news stories (either of which may be stored in the data storage 510). In some cases, the playlist generator 514 may first determine a ranking for available audible news stories, based on an extent of correspondence between attributes associated with the available audible news stories and attributes associated with the user, and then select the audible news stories with the highest rankings. The playlist module 514 may compute such rankings based on a weighted combination of various factors, such as based on the various attributes described herein.

The popularity module 516 can determine the extent of popularity of a news story in a variety of ways. In one example, this may involve the popularity module 516 determining an extent of popularity of an audible version of the news story, where the audible version is represented by TTS data. The popularity module 516 can then determine that the audible version of the news story has a threshold extent of popularity, and in response, the popularity module 516 can request recorded voice data for the news story. In some instances, the popularity module 516 may first determine a numerical value representing a news story's extent of popularity, and then determine whether the numerical value exceeds a threshold value as a basis to determine whether the news story has the threshold extent of popularity.

The popularity module 516 may analyze a number of factors to determine the extent of popularity of a news program. For example, this may involve the popularity module 516 analyzing the generation of playlists of personalized news programs for users of the personalized news service. The popularity module 516 can base a determination of an extent of popularity of a news story on an extent to which an audible version of that news story is selected for inclusion in the playlists discussed above, where that audible version is represented by TTS data. For example, the popularity module 516 may determine the extent of popularity based in part on the frequency at which the audible version of the news story is selected for inclusion in such playlists, or perhaps on a number of instances that the audible version of the news story is selected for inclusion in such playlists.

Moreover, the popularity module 516 may base an extent of popularity determination on the near selection of an audible news story for inclusion in playlists. For example, the popularity module 516 may analyze rankings assigned to a given audible news story by the playlist module 514 in connection with generating playlists for various users. The popularity module 516 can then determine an extent of popularity for that audible news story on the basis of such rankings. As a result, an audible news story may be determined to have a relatively high extent of popularity, perhaps even above the threshold extent of popularity, even if the audible news story is not actually selected for inclusion in playlists, but is frequently ranked nearly high enough to be selected for inclusion in playlists.

By basing the extent of popularity determinations at least partially on the generation of playlists, the popularity module 516 implicitly accounts for the real time listening preferences of the current users of the personalized news service. Indeed, because the audible news stories selected for inclusion in the playlists generated by the playlist module 514 are selected on the basis of correspondence between attributes associated with the users and attributes associated with the audible news stories, the audible news stories selected for inclusion in the playlists (or nearly selected for inclusion) are likely to be audible news stories aligned with the listening preferences of the current users.

The popularity module 516 may additionally consider other factors related to the extents of popularity of different news stories. For example, the popularity module 516 may at least partially base a determination of an extent of popularity on external indicators of a news story's popularity that are communicated to the server 502. Such external indicators may include website viewership analytics for an internet-published version of the news story, indicators of social media reaction to a text-based version of the news story, or perhaps an indication of feedback from an editor or producer related to the news story. The popularity module 516 may also base a determination of the extent of popularity of a news story partially on other attributes associated with the news story (e.g., authorship or source of publication). Moreover, the popularity module 516 may also base a determination of the extent of popularity of a news story partially based on the news story having attributes that relate to other popular news stories (e.g., attributes for a news category or topic in common with another news story already determined to have a relatively high extent of popularity).

Additionally or alternatively, the popularity module 516 may partially base a determination of an extent of popularity of an audible news story on real-time feedback received from users engaged in listening to the audible news story. For example, users of the client devices 504a-c may provide an input to their respective client device 504a-c to indicate a favorable reaction or an unfavorable reaction to a given audible news story. Data representing the users' collective feedback can be transmitted to the server 502, and the popularity module 516 can analyze such feedback information and partially base its extent of popularity determinations on the feedback. When listening to a personalized news program, users also may elect to skip past an audible news story that was included in their playlist, and data representing that action may be sent to the server 502 and used by the popularity module 516 as a basis for determining an extent of popularity of that audible news story. In some cases, such real-time feedback information from an individual user may be used primarily to update attributes associated with that user (e.g., in the data storage 510) and thereby adjust the generation of subsequent playlists of personalized news programs for that user, rather than as an indication of the audible news story's extent of popularity.

C. Real Time Popularity Based Audible Content Acquisition

In an example, the server 502 receives data representing a text-based version of a news story, as well as perhaps external indicators of the extent of popularity of the news story. The received data representing the text-based version of the news story may be sourced from one or more news distribution outlets, such as internet websites, print-media publications, and perhaps other sources news information. The external indicators may be derived from website viewership analytics, measurements of social media reactions to the news story, or other factors indicating the extent of popularity of the news story. The server 502 can supplement the data representing the text-based version of the news story with such information. In addition, the server 502 may also analyze the text-based version of the news story and associate attributes with it.

The server 502 can then receive a request for a playlist of a personalized news program from the client device 504a. The playlist module 514 can then refer to the attributes associated with the user of client device 504a, and generate a playlist including audible news stories that have attributes corresponding to the attributes associated with the user. The server 502 can then transmit the generated playlist to the client 504a, and the client 504a can stream data representing the selected audible news stories from the server 502 (e.g., TTS data or recorded voice data).

As noted above, an audible version of a news story may be represented as TTS data or recorded voice data. The popularity module 516 can analyze the generated playlists and determine the extents of popularity of the audible news stories for which recorded voice data has not already been created, and determine which of those audible news stories to transmit requests to the recording station 508 for recorded voice data. The popularity module 516 can determine that a news story has a threshold extent of popularity as described above, and then the server 502 can send a request to the recording station 508 for recorded voice data for that news story. The recording station 508 can operate as described above to create the requested recording and transmit data representing the recording to the server 502. Upon receipt of the recorded voice data, the server 502 may also update a lookup reference that associates an audible version of the news story with the corresponding text-based version of the news story. The recorded voice data can then be used to fulfill a request to the server 502 from a client to stream an audible version of the news story, whereas prior to receipt of the recorded voice data, the server 502 may fulfill a similar request using TTS data.

In some examples, the system 500 can operate to create natural voice recordings of a news story sufficiently rapidly to incorporate the resulting recorded voice data into ongoing streamed personalized news programs. For example, a total duration for the server 502 to determine that a news story has a threshold extent of popularity, request recorded voice data for that news story from the recording station 508, and then receive the requested recorded voice data may be less than a typical duration of a personalized news program. The total duration may be less than about 30 minutes, for example. And because the requests for recorded voice data may also be made based on real time determinations of extents of popularity (e.g., based on selection of audible news stories for inclusion in personalized news programs), recordings may be requested, created, and incorporated into a streaming personalized news program all after the playlist for that personalized news program has been generated.

Figure 6:
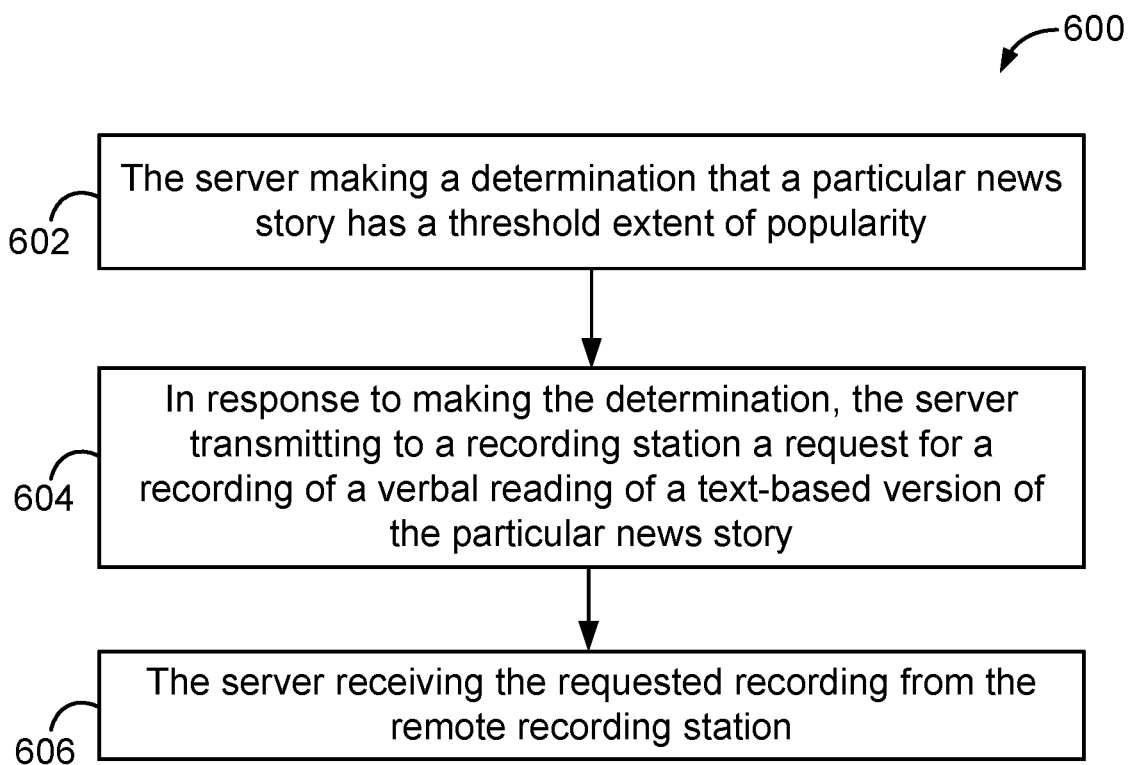
FIG. 6 is a flow chart depicting functions of another example method.

FIG. 6 is a flowchart of an example process 600 that may be performed by the various systems described herein. For example, the process 600 may be performed by one or more components of the system 500, such as the server 502, described in connection with FIG. 5 or by various components described in connection with FIG. 1. And in some cases, the processes may be performed by multiple components that coordinate to provide the functionality described. Although for example purposes, the process 600 is described as being performed by components of the system 500 described in connection with FIG. 5.

At block 602, the server 502 makes a determination that a particular news story has a threshold extent of popularity. Such a determination may be made using the popularity module 516, for example. At block 604, the server 502 transmits to the remote recording station 508 a request for a recording of a verbal reading of a text-based version of the particular news story. For example, the server 502 can send such a request to the remote recording station 508, as described above. At block 606, the server 502 receives data representing the requested recording from the remote recording station 508.

V. Example Variations

The variations described in connection with select examples of the disclosed systems and methods may be applied to all other examples of the disclosed systems and methods.

In some examples, the system 500 described in connection with FIG. 5 may include multiple recording stations, such as a network of recording stations that each operate similarly to the recording station 508 described above. The server 502 may transmit a request for recorded voice data to more than one of the recording stations and/or may select one of the recording stations and transmit the request to that recording station. For example, the server 502 may select one of the recording stations based on an availability of a narrator associated with that recording station during an upcoming period of time. The server 502 may additionally or alternatively select one of the recording stations based on a correspondence between a geographic location of the recording station and an attribute associated with the news story. For instance, the server 502 may preferentially request recorded voice data from recording stations associated with certain news outlets for a text-based version of a news story authored by that news outlet. The server 502 may also preferentially request recorded voice data from recording stations located in a certain geographic region for a text-based version of a news story that includes topics related to that geographic region.

Furthermore, the server 502 may transmit a list of a group of news stories that have threshold extents of popularity to more than one of the recording stations. The individual recording stations can then select news stories from amongst the group and create recorded voice data of those stories. To coordinate the efforts of the multiple recording stations (and the narrators at those recording stations), the recoding stations may communicate amongst one another and/or with the server 502 upon selecting one of the news stories from the group. Upon one of the recording stations selecting a news story for recording, the server 502 may update the list of news stories to remove the selected news story, and communicate the update to the recording stations. As such, each of the recording stations can be informed of the efforts of the other recording stations and thereby avoid the creation of duplicative recordings.

Moreover, the server 502 may order the group of news stories in the list sent to the recording stations in accordance with the relative priority of creating recorded voice data for each news story in the group. For example, the popularity module 516 may determine the extent of popularity of each news story, the group of news stories having threshold extents of popularity can be identified, and a list of those news stories can be ordered in accordance with the relative extents of popularity of the news stories in the group. Although the relative extents of popularity of each news story may be indicated by another technique rather than the ordering of the news stories in the list. In some examples, different lists may be transmitted to different recording stations based on the relative priority of creating recorded voice data from each of the recording stations. For instance, lists for each recording station may be ordered partially based on correspondences between attributes associated with the news stories in each list and the geographic location, or other factors, associated with each recording station.

The recording stations that receive the list can then select the news stories from the group that have the highest extents of popularity, as indicated by the list. The individual recording stations can then communicate amongst one another and/or with the server 502 to indicate a selection of one of the news stories. Upon receiving an indication that one of the news stories in the group has been selected for recording by a recording station, the server 502 can update the list by both removing the selected news story and also re-ordering the remaining news stories in the group in accordance with the relative priority of the remaining news stories in the group. The server 502 can then transmit an indication of the updated list to the recording stations. Other techniques for coordinating operations of the individual recording stations can also be used to inhibit the creation of duplicative recorded voice data.

Further, while one or more functions have been described as being performed by or otherwise related to certain devices or entities (e.g., the server 102 or 502, or the client 104 or 504a-c), the functions may be performed by or otherwise related to any device or entity. As such, any function that has been described as being performed by the server 102 could alternatively be performed by a different server, by the client 104, or a combination thereof. For instance, in one example, one server could generate and transmit a playlist to a client, and based on the playlist data of the playlist, the client could request and receive different portions of audible content from multiple other servers.

Further, the functions need not be performed in the disclosed order, although in some examples, an order may be preferred. Also, not all functions need to be performed to achieve the desired advantages of the disclosed system and method, and therefore not all functions are required.

While select examples of the disclosed system and method have been described, alterations and permutations of these examples will be apparent to those of ordinary skill in the art. Other changes, substitutions, and alterations are also possible without departing from the disclosed system and method in its broader aspects as set forth in the following claims.

What is claimed is:

1. A computer-implemented method comprising:
    generating a plurality of playlists for a plurality of users, wherein each of the playlists includes references to one or more media items selected from a plurality of media items, and wherein generating the plurality of playlists comprises determining rankings for each of the plurality of media items;
    based on the rankings, determining that a particular media item of the plurality of media items has at least a threshold extent of popularity;
    transmitting, to a remote recording station, a request for a human verbal reading of the particular media item;
    receiving, from the remote recording station, an audio file of the human verbal reading; and
    storing, for future inclusion in a generated playlist, the audio file of the human verbal reading;
    determining that references to the particular media item have been included in one or more further playlists;
    updating the references to the particular media item in the one or more further playlists to refer to the audio file of the human verbal reading; and
    transmitting, to a client device, a particular playlist of the one or more further playlists, wherein the particular playlist includes a reference to the audio file of the human verbal reading, and wherein the client device is configured to: traverse the particular playlist, retrieve the audio file of the human verbal reading during traversal of the particular playlist, and Play out the audio file of the human verbal reading.

2. The computer-implemented method of claim 1, wherein determining that the particular media item has at least the threshold extent of popularity comprises determining an extent of correspondence between attributes associated with the particular media item and attributes associated with users.

3. The computer-implemented method of claim 1, wherein the client device begins playing out the audio file of the human verbal reading before retrieval thereof completes.

4. The computer-implemented method of claim 1, wherein the particular media item, prior to updating, is an initial audio file generated by a computerized text-to-speech system.

5. The computer-implemented method of claim 4, wherein transmitting the request for the human verbal reading is based on the initial audio file having been automatically generated by the computerized text-to-speech system.

6. The computer-implemented method of claim 1, wherein the particular media item, prior to updating, is a text file.

7. The computer-implemented method of claim 1, wherein the particular media item comprises a news story, and wherein the remote recording station comprises a remote news studio.

8. The computer-implemented method of claim 1, further comprising:
    selecting the remote recording station from a plurality of remote recording stations based on a correspondence between a feature of the remote recording station and an attribute associated with the particular media item.

9. The computer-implemented method of claim 1, further comprising:
    selecting the remote recording station from a plurality of remote recording stations based on a correspondence between a geographic location of the remote recording station and an attribute associated with the particular media item.

10. A non-transitory computer-readable medium storing instructions that, when executed by a processor, cause performance of operations comprising:
    generating a plurality of playlists for a plurality of users, wherein each of the playlists includes references to one or more media items selected from a plurality of media items, and wherein generating the plurality of playlists comprises determining rankings for each of the plurality of media items;
    based on the rankings, determining that a particular media item of the plurality of media items has at least a threshold extent of popularity;
    transmitting, to a remote recording station, a request for a human verbal reading of the particular media item;
    receiving, from the remote recording station, an audio file of the human verbal reading; and
    storing, for future inclusion in a generated playlist, the audio file of the human verbal reading;
    determining that references to the particular media item have been included in one or more further playlists;
    updating the references to the particular media item in the one or more further playlists to refer to the audio file of the human verbal reading; and
    transmitting, to a client device, a particular playlist of the one or more further playlists, wherein the particular playlist includes a reference to the audio file of the human verbal reading, and wherein the client device is configured to: traverse the particular playlist, retrieve the audio file of the human verbal reading during traversal of the particular playlist, and Play out the audio file of the human verbal reading.

11. The non-transitory computer-readable medium of claim 10, wherein determining that the particular media item has at least the threshold extent of popularity comprises determining an extent of correspondence between attributes associated with the particular media item and attributes associated with users.

12. The non-transitory computer-readable medium of claim 10, wherein the particular media item, prior to updating, is an initial audio file generated by a computerized text-to-speech system.

13. The non-transitory computer-readable medium of claim 12, wherein transmitting the request for the human verbal reading is based on the initial audio file having been automatically generated by the computerized text-to-speech system.

14. The non-transitory computer-readable medium of claim 10, wherein the particular media item, prior to updating, is a text file.

15. The non-transitory computer-readable medium of claim 10, wherein the client device begins playing out the audio file of the human verbal reading before retrieval thereof completes.

16. A computing system comprising:
a processor;
a memory; and
program instructions, stored in the memory, that when executed by the processor, cause the computing system to perform operations comprising:
generating a plurality of playlists for a plurality of users, wherein each of the playlists includes references to one or more media items selected from a plurality of media items, and wherein generating the plurality of playlists comprises determining rankings for each of the plurality of media items;
based on the rankings, determining that a particular media item of the plurality of media items has at least a threshold extent of popularity;
transmitting, to a remote recording station, a request for a human verbal reading of the particular media item;
receiving, from the remote recording station, an audio file of the human verbal reading; and
storing, for future inclusion in a generated playlist, the audio file of the human verbal reading;
determining that references to the particular media item have been included in one or more further playlists;
updating the references to the particular media item in the one or more further playlists to refer to the audio file of the human verbal reading; and
transmitting, to a client device, a particular playlist of the one or more further playlists, wherein the particular playlist includes a reference to the audio file of the human verbal reading, and wherein the client device is configured to: traverse the particular playlist, retrieve the audio file of the human verbal reading during traversal of the particular playlist, and play out the audio file of the human verbal reading.

17. The computing system of claim 16, wherein determining that the particular media item has at least the threshold extent of popularity comprises determining an extent of correspondence between attributes associated with the particular media item and attributes associated with users.

18. The computing system of claim 16, wherein the client device begins playing out the audio file of the human verbal reading before retrieval thereof completes.

* * * * *

UNITED STATES PATENT AND TRADEMARK OFFICE
CERTIFICATE OF CORRECTION

PATENT NO. : 11,763,800 B2
APPLICATION NO. : 17/969509
DATED : September 19, 2023
INVENTOR(S) : Venkatarama Anilkumar Panguluri et al.

It is certified that error appears in the above-identified patent and that said Letters Patent is hereby corrected as shown below:

In the Claims

Claim 1 at Column 19, Line 43, please delete "and" appearing at the end of the line;

Claim 1 at Column 19, Line 57, please delete "Play" before "out the" and add "play" in its place;

Claim 10 at Column 20, Line 46, please delete "and" appearing at the end of the line;

Claim 10 at Column 20, Line 60, please delete "Play" before "out the" and add "play" in its place; and Claim 16 at Column 22, Line 4, please delete "and" appearing at the end of the line.

Signed and Sealed this
Seventh Day of November, 2023

Katherine Kelly Vidal
*Director of the United States Patent and Trademark Office*